O. F. HELWIG.
CREAM CUP.
APPLICATION FILED FEB. 26, 1912.
1,222,206.
Patented Apr. 10, 1917.
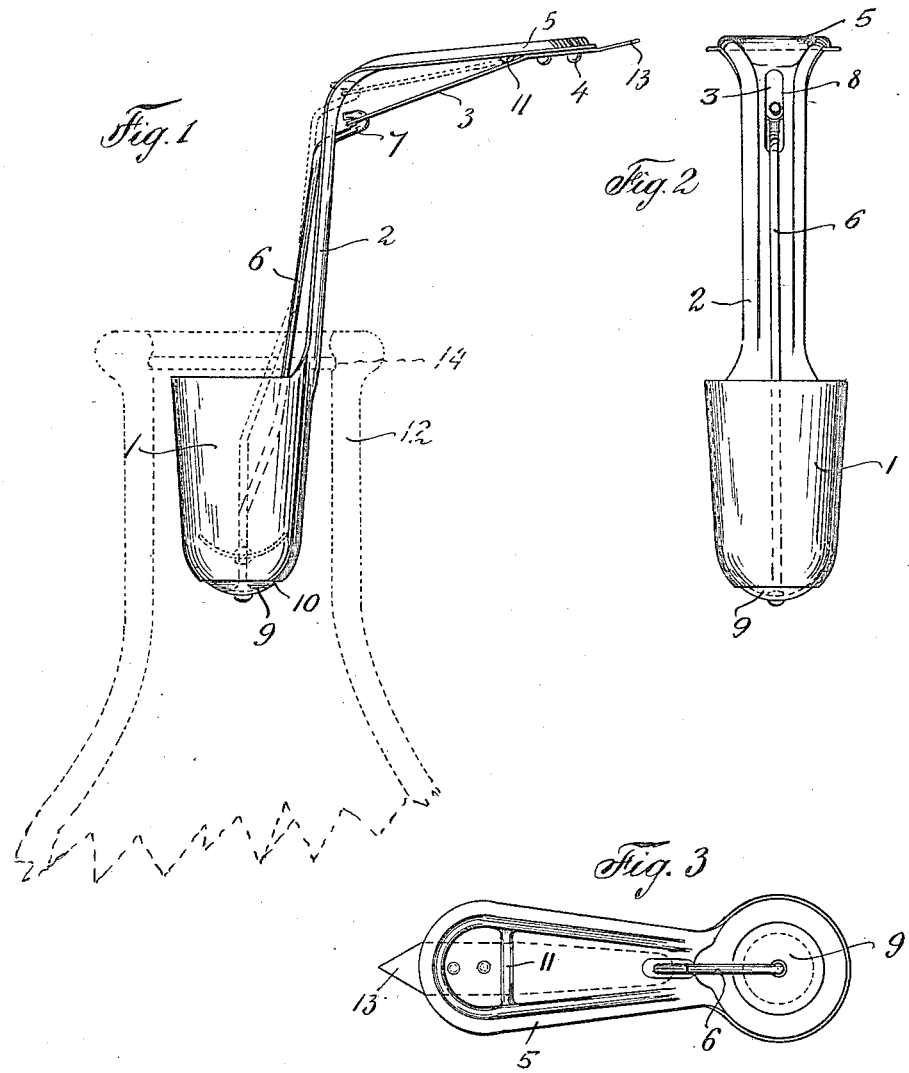

UNITED STATES PATENT OFFICE.

OSCAR F. HELWIG, OF CHICAGO, ILLINOIS, ASSIGNOR TO STANDARD DIE & SPECIALTY COMPANY, OF CHICAGO, ILLINOIS.

CREAM-CUP.

1,222,206.   Specification of Letters Patent.   Patented Apr. 10, 1917.

Application filed February 26, 1912. Serial No. 679,817.

*To all whom it may concern:*

Be it known that I, OSCAR F. HELWIG, a citizen of the United States, and a resident of Chicago, Illinois, have invented a certain new and useful Improvement in Cream-Cups, of which the following is a specification.

The essential object of the invention is to provide a simple and inexpensive device for removing cream from a bottle or other receptacle in such manner that the cream and milk within the receptacle will not be agitated by the introduction of the hereinafter described invention into the receptacle.

In the drawings Figure 1 is a view of the cream cup constituting the present invention when being used for removing the cream which has risen to the top of the common milk bottle; Fig. 2 is a front elevation of my improved device; and Fig. 3 is a top plan view of the device.

The cup 1 within which the cream is received is of any suitable size and shape, though preferably it may be practically in the shape of a truncated cone and not too large in diameter to be inserted within the mouth of the ordinary milk bottle. To the cup 1 the handle 2 is secured, the handle being preferably L-shaped. A spring 3 is secured by rivets 4 to the arm 5 of the handle and on the lower side thereof. A wire or hanger 6 is provided with the hook-like end 7 which projects through a slot 8 in the vertical arm of the handle 2, and is connected to the spring 3; hence, if the finger of the operator is caused to pull the spring 3 upwardly toward the horizontal arm 5 of the handle, the wire 6 will be lifted therewith and when the spring is released the wire 6 and the valve 9 secured thereto will be permitted to fall.

In the bottom of the cup 1 is the aperture or perforation 10, and the cap or valve 9 is of such size and shape as will permit the valve or cap to close said perforation when the spring is released; but when the spring is lifted to the position shown in the dotted lines in Fig. 1, the cap 9 is raised, so that it does not close the opening 10. The under side of the arm 5 is provided with a ridge or stud 11 against which the spring 3 seats.

The valve or closure 9 and its supporting and connecting rod or wire hanger 6, are so arranged that they may be easily detached from the spring and lifted out of the cup for repairing or cleaning.

This is accomplished by unhooking the hook end 7 from the opening in the end of the spring 3, pulling said hook end laterally through the slot 8, and then lifting and removing both the valve and its hanger out of the cup.

The operation is as follows: When it is desired to use the device, the operator grasps the same by the arm 5 and presses the spring 3 to the position shown in the dotted lines in Fig. 1, thus, obviously, raising the cap 9 to the position shown in dotted lines in said figure and opening the aperture 10. The cream which has collected in the top or mouth of the bottle 12 will pass through said aperture 10 and collect within the cup 1. When the device has moved to a position where the top edge of the cup is substantially on a level with the top of the liquid within the bottle 12, the spring 3 is gently released, and thus the aperture 10 is closed; after which the cup 1, which is then filled with cream that has entered into the bottom of the cup through the aperture 10, is emptied into any convenient receptacle, and this operation is repeated as often as desired. Because of the fact that the cream enters at the bottom of the receptacle and does not have to pass over the top edge of the cup 1, the contents of the bottle 12 are scarcely agitated at all because of the insertion of the device, since the cubical displacement within the bottle is very small, being merely the displacement of the walls and bottom of the cup and not of the space within said walls and bottom.

The device is preferably made of aluminum or some other non-corrosive material which can readily be cleansed by dipping the cup into hot water. The spring 3 projects outwardly beyond the end of the handle and terminates in a sharp point 13, which will be found useful in removing the pulp cap which is used to close the bottle, being normally seated in notch 14. The handle is provided with ribs which reinforce said handle and keep same from bending.

The handle is preferably formed integral with the cup and in one strip of metal longitudinally channeled to provide a practically rigid construction, the spring is attached at its outer end to the under surface of the handle and the lateral hook of the rod is fitted through the opening in the spring in such a way that it may be easily unhooked to allow the rod to be lifted and the closure removed from the cup.

Many changes in the details of construction may be made without departing from the scope of the invention or of the various claims.

I claim as my invention:

A device of the class described for removing cream from the top of a milk bottle comprising a truncated conical cup of suitable size to fit loosely within the mouth of a milk bottle, and having an aperture in its bottom, a closure for said aperture arranged within the cup, a stiff practically rigid inverted L-shaped handle for said cup formed of a channeled strip of metal integral with the cup and extending upwardly from the edge thereof, said handle having a vertical lower portion which merges at its lower extremity in the cup side, and a horizontal top portion which extends outwardly from the upper extremity of the vertical lower portion, said vertical lower portion having a short longitudinal guide slot formed therein in proximity to and below the juncture with the horizontal top portion, a wire having its lower end secured to the closure and its upper portion bent laterally outward and extended through the guide slot and then bent upon itself at its outer extremity to form a hook, and a flat spring secured at its outer end to the under surface of the top portion of the handle and extending beneath said horizontal portion to near its juncture with the vertical portion, said spring having an aperture near its inner end through which the hook end of the wire is removably fitted.

In testimony whereof I have hereunto affixed my name in the presence of two witnesses.

OSCAR F. HELWIG.

Witnesses:
 HOWARD A. MERICH,
 GEO. A. SHAFER.

Copies of this patent may be obtained for five cents each, by addressing the "Commissioner of Patents, Washington, D. C."